(12) United States Patent
Shibata et al.

(10) Patent No.: US 8,374,070 B2
(45) Date of Patent: Feb. 12, 2013

(54) MAGNETIC RECORDING MEDIUM HAVING PIEZOELECTRIC MATERIAL AND APPARATUS FOR RECORDING INFORMATION DATA INTO SUCH MAGNETIC MEDIUM

(75) Inventors: Hisato Shibata, Higashine (JP); Hideaki Takahoshi, Higashine (JP); Yuki Yoshida, Kawasaki (JP); Akira Kikuchi, Higashine (JP)

(73) Assignee: Showa Denko K.K., Tokyo (JP)

( * ) Notice: Subject to any disclaimer, the term of this patent is extended or adjusted under 35 U.S.C. 154(b) by 377 days.

(21) Appl. No.: 12/682,541

(22) PCT Filed: Oct. 12, 2007

(86) PCT No.: PCT/JP2007/069989
§ 371 (c)(1),
(2), (4) Date: Apr. 9, 2010

(87) PCT Pub. No.: WO2009/047866
PCT Pub. Date: Apr. 16, 2009

(65) Prior Publication Data
US 2010/0246045 A1   Sep. 30, 2010

(51) Int. Cl.
*G11B 9/00* (2006.01)
(52) U.S. Cl. .................... 369/126; 369/13.33; 369/13.13
(58) Field of Classification Search ............... 369/126, 369/120, 13.33, 13.32, 13.13, 13.02, 13.17; 360/59, 55; 385/129, 31, 88–94; 428/836, 428/837, 831
See application file for complete search history.

(56) References Cited

U.S. PATENT DOCUMENTS

| | | | |
|---|---|---|---|
| 2004/0105373 A1* | 6/2004 | Maeda et al. | 369/126 |
| 2004/0224184 A1 | 11/2004 | Hikosaka et al. | |
| 2008/0024910 A1* | 1/2008 | Seigler | 360/59 |

FOREIGN PATENT DOCUMENTS

| | | | |
|---|---|---|---|
| JP | 58-068209 A | | 4/1983 |
| JP | 59-019220 A | | 1/1984 |
| JP | 2000-020935 A | | 1/2000 |
| JP | 2000163732 A | * | 6/2000 |
| JP | 2000195033 A | * | 7/2000 |
| JP | 2004-265498 A | | 9/2004 |
| JP | 2008-034087 A | | 2/2008 |

* cited by examiner

*Primary Examiner* — Tan X Dinh
(74) *Attorney, Agent, or Firm* — Sughrue Mion, PLLC

(57) ABSTRACT

Disclosed is a magnetic recording medium comprising a substrate, a magnetic recording layer formed on the substrate to record magnetic information, and a piezoelectric material disposed adjacent to the magnetic recording layer and capable of contracting and expanding. Preferably, piezoelectric members made of the piezoelectric material are formed in such a manner as to be spaced a predetermined distance apart from each other on the substrate in a direction crossing a track on the magnetic recording layer, and the magnetic recording layer is formed between the piezoelectric members. When subjected to laser light or ultraviolet radiation, the piezoelectric material contracts or expands at least in the direction crossing the track. The piezoelectric material is selected from the group consisting of lead lanthanum zirconate titanate, barium titanate, and potassium niobate.

5 Claims, 7 Drawing Sheets

MAGNETIC RECORDING MEDIUM HAVING PIEZOELECTRIC MATERIAL AND APPARATUS FOR RECORDING INFORMATION DATA INTO SUCH MAGNETIC MEDIUM

TECHNICAL FIELD

The present invention relates to a magnetic recording medium having a magnetic recording layer for recording magnetic information (writing data) using a magnetic recording head, and to a magnetic recording method and a magnetic recording apparatus for recording magnetic information by moving the magnetic head to a designated position on the magnetic recording medium and applying a magnetic field to that position.

BACKGROUND ART

In a magnetic storage apparatus (which is generally known as a magnetic recording apparatus) such as a magnetic disk apparatus or a magneto-optical disk apparatus used as an external storage device for a computer, a data read operation is performed by recording magnetic information in a designated position (for example, a designated track) on the magnetic recording surface of a magnetic recording medium, such as a disk by using a magnetic head-exemplified by a thin-film magnetic head, and a data read operation is performed by reproducing (reading) information recorded in a designated position on the magnetic recording surface.

In the field of such a magnetic recording device, the need for larger recording capacity and higher recording density has been increasing more than ever before. To achieve higher recording density, the size of the crystal grains contained in the magnetic recording layer of magnetic recording media must be made even smaller and more uniform. The reason is that if relatively large crystal grains remain, magnetic reversals may not be fully accomplished for all the crystal grains when writing data, and in some regions, the direction of magnetization may remain unreversed. The presence of such unreversed regions can result in noise when writing data. There is therefore a need to make the crystal grains as fine as possible in order to reduce the occurrence of such regions.

In the case of longitudinal magnetic recording in which the direction of magnetization in the magnetic recording layer is parallel to the plane of the magnetic recording medium, the recording density has already reached its limit due to thermal stability, and therefore, vertical magnetic recording in which the direction of magnetization in the magnetic recording layer is perpendicular to the plane of the magnetic recording medium is becoming the predominant method. In the next generation of magnetic recording media employing the vertical magnetic recording technology, it will be necessary for even higher recording density, but to satisfy such a need, a high magnetic anisotropy material having a high magnetic anisotropy energy has to be used.

However, the theoretical limit of the maximum value of the magnetic field that can be generated by a magnetic head is about 16 kOe (1273 kA/m (amperes/meter) in SI unit system). Therefore, in the future, a situation may occur where data cannot be written to a magnetic recording medium fabricated using a high magnetic anisotropy material. In other words, it may be difficult for vertical magnetic recording technology to satisfy the need to further increase the recording density of magnetic recording media. To address this problem, a technology is needed that reduces the magnetic anisotropy energy of the high magnetic anisotropy material only when writing data, so that data can be written stably to a magnetic recording medium fabricated using a high magnetic anisotropy material, while allowing the use of a conventional magnetic head.

For reference purposes, patent documents 1 and 2 are presented below as prior art documents disclosing magnetic head structures relating to conventional vertical magnetic recording technology.

However, patent documents 1 and 2 only disclose the structures of magnetic heads for writing data to vertical magnetic recording media, and neither makes any mention of the structure of the vertical magnetic recording medium itself.

Patent document 1: Japanese Unexamined Patent Publication No. S59-019220

Patent document 2: Japanese Unexamined Patent Publication No. S58-068209

DISCLOSURE OF THE INVENTION

It is an object of the present invention to provide a magnetic recording medium, a magnetic recording method, and a magnetic recording apparatus that can address the need to further increase the recording density of the magnetic recording medium, in particular, a magnetic recoding medium employing a high magnetic anisotropy material, while allowing the use of a magnetic recording head when writing data to such a magnetic recording medium.

To achieve the above object, the magnetic recording medium of the invention comprises: a substrate; a magnetic recording layer formed on the substrate to record magnetic information; and a piezoelectric material disposed adjacent to the magnetic recording layer and capable of contracting and expanding.

Preferably, in the magnetic recording medium, piezoelectric members made of the piezoelectric material are formed in such a manner as to be spaced a predetermined distance apart from each other on the substrate in a direction crossing a track on the magnetic recording layer, and the magnetic recording layer is formed between the piezoelectric members.

Preferably, the magnetic recording medium further comprises: first electrodes formed in such a manner as to be spaced a predetermined distance apart from each other on the substrate in the direction crossing the track or in a direction extending along the track; second electrodes formed in such a manner as to be spaced a predetermined distance apart from each other in a vertical direction in-plane relative to the direction of the first electrodes formed on the magnetic recording layer, and wherein the piezoelectric members are formed as a first piezoelectric element and a second piezoelectric element, respectively, the first piezoelectric element is formed between the first electrodes, the second piezoelectric element is formed between the second electrodes, and the magnetic recording layer is formed between the first piezoelectric element and the second piezoelectric element.

In the magnetic recording method of the invention, the piezoelectric material disposed adjacent to the magnetic recording layer is caused to contract or expand thereby reducing the magnetic anisotropy energy of the magnetic recording layer, and the magnetic information is recorded on the magnetic recording medium by applying an external magnetic field.

Preferably, in the magnetic recording method, the piezoelectric material is caused to contract or expand by applying laser light or ultraviolet light.

Further preferably, in the magnetic recording method, the piezoelectric material is caused to contract or expand by applying a voltage.

The magnetic recording apparatus of the invention comprises: a magnetic recording medium comprising a substrate, a magnetic recording layer formed on the substrate to record magnetic information, and a piezoelectric material which contracts or expands when subjected to laser light or ultraviolet radiation, wherein piezoelectric members made of the piezoelectric material are formed in such a manner as to be spaced a predetermined distance apart from each other on the substrate in a direction crossing a track on the magnetic recording layer, and the magnetic recording layer is formed between the piezoelectric members; laser light or ultraviolet light radiating means for radiating laser light or ultraviolet light toward the magnetic recording medium; and magnetic field applying means for applying a magnetic field to the magnetic recording medium.

Alternatively, the magnetic recording apparatus of the invention comprises: a magnetic recording medium comprising a substrate, a magnetic recording layer formed on the substrate to record magnetic information, first electrodes formed in such a manner as to be spaced a predetermined distance apart from each other on the substrate in a direction crossing a track on the magnetic recording layer or in a direction extending along the track, second electrodes formed in such a manner as to be spaced a predetermined distance apart from each other in a vertical direction in-plane relative to the direction of the first electrodes formed on the magnetic recording layer, a first piezoelectric element formed between the first electrodes, and a second piezoelectric element formed between the second electrodes, wherein the magnetic recording layer is formed between the first piezoelectric element and the second piezoelectric element; voltage applying means for applying, in accordance with the recording position of the magnetic information, a voltage to the first and second piezoelectric elements, respectively, via the first and second electrodes of the magnetic recording medium; and magnetic field applying means for applying a magnetic field to the magnetic recording medium.

To summarize, in the magnetic recording medium, magnetic recording method, and magnetic recording apparatus disclosed herein, the piezoelectric material is disposed adjacent to the magnetic recording layer, and laser light or the like is applied to the piezoelectric material, causing the piezoelectric material to deform, thereby exerting compressive stress on the magnetic recording layer; as a result, the magnetic anisotropy of the magnetic recording layer is reduced by the inverse magnetostrictive effect, allowing data to be written using a magnetic head. With this configuration, it is possible to readily address the need for even higher recording density required, in particular, of a magnetic recording medium employing a high magnetic anisotropy material.

Alternatively, in the magnetic recording medium, magnetic recording method, and magnetic recording apparatus disclosed herein, the first and second piezoelectric elements respectively provided on the upper and lower surfaces of the magnetic recording layer are oriented at right angles to each other, and a voltage is selectively applied to the designated first and second piezoelectric elements, causing the piezoelectric material to deform and thereby exerting a compressive stress on the magnetic recording layer; as a result, the magnetic anisotropy of the magnetic recording layer is reduced by the inverse magnetostrictive effect, allowing data to be written using a magnetic head. With this configuration also, it is possible to readily address the need for even higher recording density required, in particular, of a magnetic recording medium employing a high magnetic anisotropy material.

BRIEF DESCRIPTION OF THE DRAWINGS

The present invention will be described below with reference to the accompanying drawings, wherein.

BEST MODE FOR CARRYING OUT THE INVENTION

Figure 1:
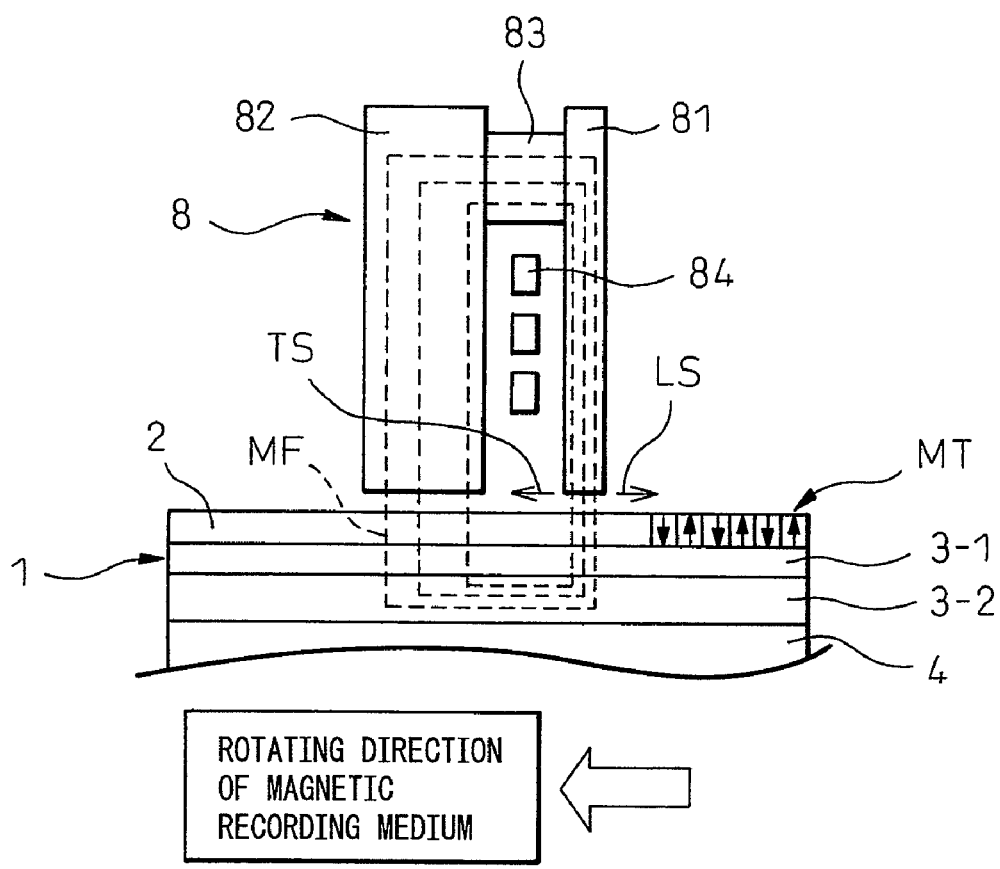
FIG. 1 is a schematic diagram for explaining the basic principle of information recording performed using a conventional vertical magnetic recording head.
Figure 2:
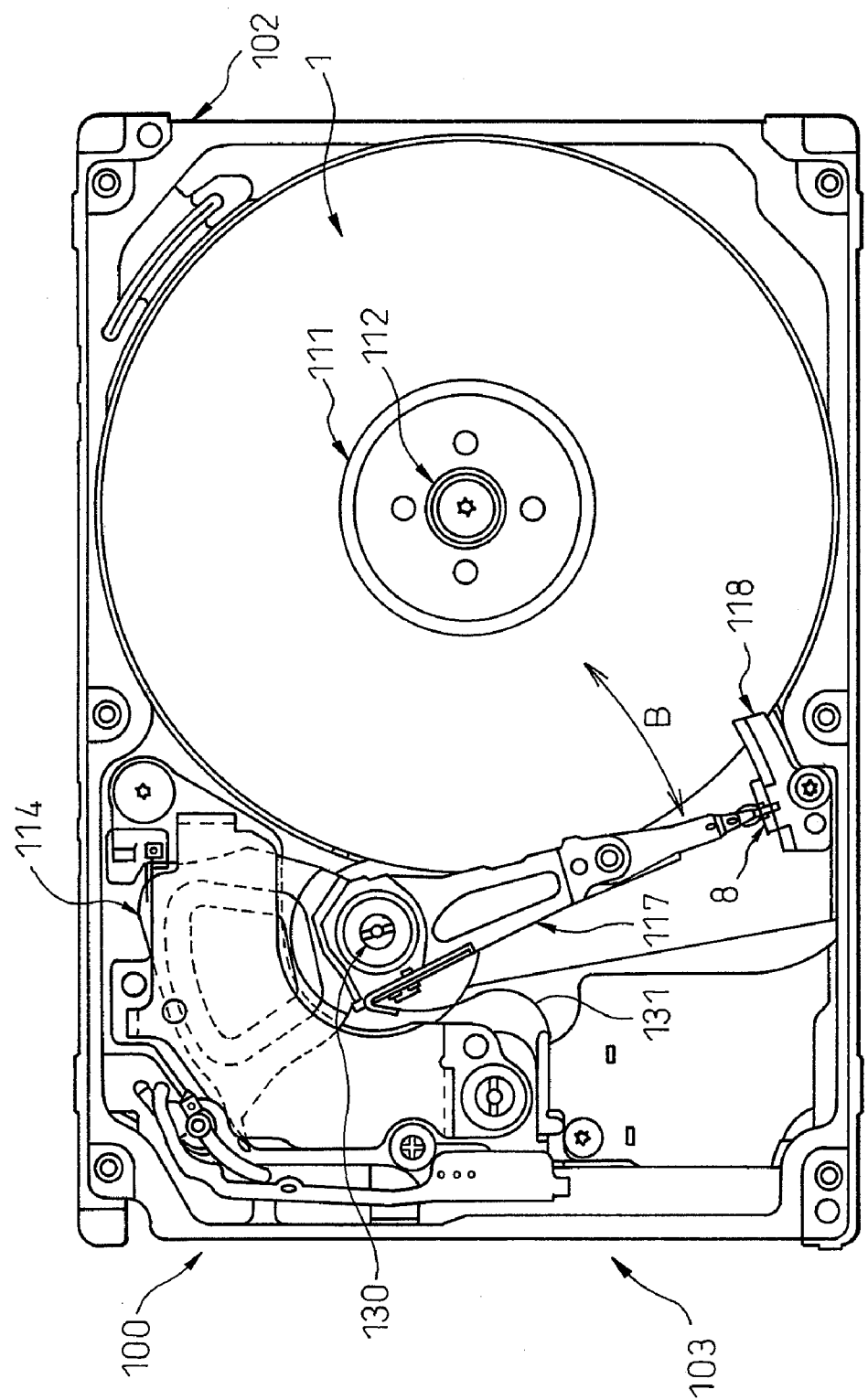
FIG. 2 is a plan view showing the general mechanical configuration of a conventional magnetic recording apparatus.

Before describing the structure of a magnetic recording medium and the configuration of a magnetic recording apparatus according to the present embodiment, the basic principle of information recording performed using a conventional vertical magnetic recording head and the general mechanical configuration of a conventional magnetic recording apparatus will be described in detail below with reference to the accompanying drawings (FIGS. 1 and 2).

FIG. 1 is a schematic diagram explaining the basic principle of information recording performed using a conventional vertical magnetic recording head. In the illustrated example, a single-pole vertical magnetic recording head is used as an example of the conventional vertical magnetic recording head. The basic principle of information recording performed using the single-pole vertical magnetic recording head will be described below with reference to FIG. 1.

Generally, when recording information using a magnetic head 8 which is typically a vertical magnetic recording head, a vertical magnetic recording medium 1 having a plurality of magnetic layers (hereinafter simply referred to as the "magnetic recording medium 1"), as shown in FIG. 1, is used as the recording medium. This magnetic recording medium 1 is fabricated by stacking, on a substrate 4, a magnetic recording layer 2 formed from magnetic material such as a cobalt-chromium alloy (CoCr) and providing good orientation (magnetizing signal MT) in a direction perpendicular to the magnetic recording medium surface, an orientation control layer 3-1 for enhancing the orientation of the magnetic recording layer 2, and a soft magnetic layer 3-2 for allowing the magnetic field MF from the magnetic head 8 to escape therethrough. Preferably, an adhesion layer (not shown) for enhancing the adhesion between the substrate 4 and the soft magnetic layer 3-2 may also be formed. When the magnetic recording medium 1 is a disk, the downstream side in the direction of rotation of the disk is the trailing edge side TS (sometimes referred to simply as the trailing side), and the upstream side is the leading edge side LS (sometimes referred to simply as the leading side).

The vertical magnetic recording head shown in FIG. 1 includes a single main magnetic pole piece 81 for applying a magnetic field in the direction perpendicular to the magnetic recording surface of the magnetic recording medium 1, an auxiliary magnetic pole piece 82 for absorbing the magnetic field MF returning from the magnetic recording layer 2 in the magnetic recording surface of the magnetic recording medium 1, and a connecting portion 83 for magnetically coupling the main magnetic pole piece 81 to the auxiliary magnetic pole piece 82. When recording magnetic information in the magnetic recording layer 2 of the magnetic recording medium 1, a prescribed magnetic field is generated by flowing a current through a thin-film coil 84 located near the main magnetic pole piece 81. The magnetic field MF generated by the thin-film coil 84 passes through the main magnetic pole piece 81, and is applied to the magnetic recording layer 2 as a recording magnetic field perpendicular to the magnetic recording surface of the magnetic recording medium 1. The magnetic field MF returning from the magnetic recording layer 2 is absorbed by the auxiliary magnetic pole piece 82.

In other words, the magnetic field MF narrowed inside the main magnetic pole piece 81 by the action of the magnetic field from the thin-film coil 84 passes through the magnetic recording layer 2 and reaches the soft magnetic layer 3-2; then, the magnetic field again passes through the magnetic recording layer 2 and enters the auxiliary magnetic pole piece 82. The main magnetic pole piece 81, the magnetic recording medium 1, the auxiliary magnetic pole piece 82, and the connecting portion 83 together form a magnetic circuit. Using this magnetic circuit, the magnetizing signal MT (magnetic information) perpendicular to the magnetic recording surface of the magnetic recording medium 1 can be recorded in the magnetic recording layer 2.

FIG. 2 is a plan view showing the general mechanical configuration of a conventional magnetic recording apparatus. As an example of the conventional magnetic recording apparatus, a magnetic recording apparatus (for example, a magnetic disk apparatus) 100 is shown that is equipped with a vertical magnetic recording head 8 for recording and reproducing information (data) on a rotating magnetic recording medium (for example, a disk) 1 such as a hard disk. Hereinafter, the same component elements as those described above will be designated by the same reference numerals.

In the example shown here, the magnetic head 8 comprises a recording head (such as the recording head previously shown in FIG. 1) for recording information in a designated position (track) on the magnetic recording surface of the magnetic recording medium 1, and a reproducing head containing a reproducing head element for reproducing information recorded in a designated position on the magnetic recording surface.

Broadly, the magnetic recording apparatus 100 shown in FIG. 2 comprises a mechanical unit 102, which includes the magnetic recording medium 1, magnetic head 8, spindle motor 112, voice coil motor 114, etc. mounted inside the magnetic recording apparatus, and a control unit 103 which controls various operations such as data read and data write operations performed by the magnetic head 8. The configuration of the control unit 103 will be described in detail later with reference to FIGS. 5 and 7. The component elements forming the mechanical unit 102 are housed inside a disk enclosure, and electronic circuitry forming the control unit 103 is implemented as a plurality of integrated circuits such as LSIs (large-scale integrated circuits) mounted on a printed circuit assembly (printed circuit board). In the mechanical unit 102, one or a plurality of rotating magnetic recording media 1 such as hard disks, which are driven for rotation by the spindle motor 112 connected to a spindle 111, are mounted on a common axis.

The spindle 111 and the spindle motor 112 form the major components of the disk drive unit that rotatably drives the magnetic recording media 1. The operation of the spindle motor 112 is controlled by a servo controller (for example, refer to FIG. 5 to be described later) in the control unit 103.

A plurality of tracks (or a plurality of cylinders) are formed on the upper surface (or lower surface) that serves as the magnetic recording surface of each magnetic recording medium 1, and a data pattern corresponding to particular data is written to a designated position (or called a sector) on a given track.

The term "cylinder" here refers to a set of tracks that are arranged vertically across a plurality of magnetic recording media (i.e., a plurality of tracks arranged in a cylindrical column) and that can be accessed on the respective recording media at the same time by a plurality of magnetic heads.

As earlier described, in the magnetic recording apparatus 100 of FIG. 2, the magnetic head 8 is provided for writing data to a designated position on the magnetic recording surface of the magnetic recording medium 1, and for reading data written in a designated position on the magnetic recording surface. The magnetic head 8 is attached to the forward end of a head supporting arm 117. The arm 117 is driven by the voice coil motor 114 under the control of the servo controller (for example, refer to FIG. 5 to be described later) in such a manner as to move in a reciprocating fashion between the inner and outer tracks on the magnetic recording medium 1. Access can thus be made to any data region where data is recorded on the magnetic recording surface of the magnetic recording medium 1. A pivot bearing 130 is mounted in the center of the voice coil motor 114 to facilitate smooth reciprocating motion of the arm 117. The arm 117, the voice coil motor 114, and the pivot bearing 130 form the major components of the head drive unit that drives the magnetic head 8.

For example, when the arm 117 is turned in the direction of arrow B by the voice coil motor 114, the magnetic head 8 moves radially across the magnetic recording medium 1 and can thus access any desired track. The component elements including the voice coil motor 114 and arm 117 constitute a component called a head actuator. A flexible printed circuit board (usually abbreviated FPC) 131 is attached to the head actuator, and a servo signal for controlling the operation of the voice coil motor 114 and magnetic head 8 is supplied via the flexible printed circuit board 114.

A ramp mechanism 118, which is provided near the outer diameter of the magnetic recording medium 1, is configured to engage with the forward end of the arm 117 and hold the magnetic head 8 away from the magnetic recording medium 1.

In the magnetic recording apparatus 100, there is also provided an interface connector (not shown) for connecting the control unit 103 of the magnetic recording apparatus 100 (for example, refer to FIG. 5 to be described later) to a host system such as an external host processor (for example, refer to FIG. 5 to be described later).

As previously noted, the theoretical limit of the maximum value of the magnetic field than can be generated by the magnetic head of FIGS. 1 and 2 is about 16 kOe (1273 kA/m in SI unit system). Therefore, in the future, a situation may occur where data cannot be written to a magnetic recording medium fabricated using a high magnetic anisotropy material.

The structure of a magnetic recording medium and the configuration of a magnetic recording apparatus according to the present embodiment, which have been devised to address the above difficulty, will be described below with reference to the accompanying drawings (FIGS. 3 to 7).

Figure 3:
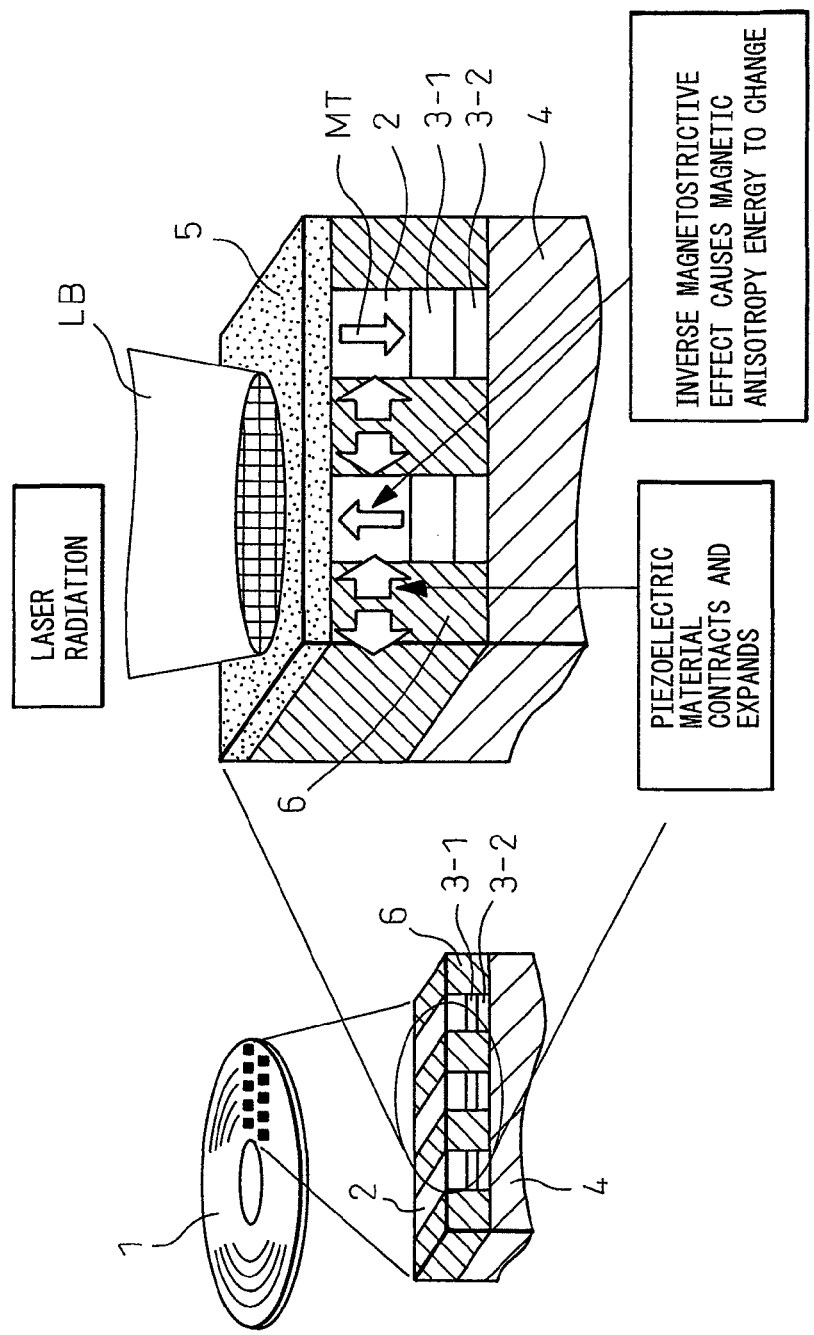
FIG. 3 is a perspective view showing the structure of a vertical magnetic recording medium according to one example of the present embodiment.

FIG. 3 is a perspective view showing the structure of a vertical magnetic recording medium according to one example of the present embodiment.

The magnetic recording medium 1 is fabricated by stacking, on a substrate 4 of a nonmagnetic material, a magnetic recording layer 2 formed from a magnetic material such as a cobalt-chromium alloy (CoCr) to record information (data) perpendicularly to the plane of the magnetic recording medium, an orientation control layer 3-1 for enhancing the orientation of the magnetic recording layer 2, a soft magnetic layer 3-2 for allowing the magnetic field from the magnetic head to escape therethrough, and a DLC protective film (diamond-like carbon film) 5 for protecting the magnetic recording layer 2. Preferably, an adhesion layer (not shown) for enhancing the adhesion between the substrate 4 and the soft magnetic layer 3-2 may also be formed. Further preferably, the magnetic recording layer 2 is a so-called granular magnetic layer formed from ferromagnetic crystal grains; nonmagnetic crystal grain boundary layers of nonmagnetic metal oxides or metal nitrides may be formed between the crystal grains.

The magnetic recording layer 2 of such a structure can be formed by sputter deposition using, for example, an oxide- or nitride-containing ferromagnetic metal target.

The material for forming the granular magnetic layer is not specifically limited, but a CoPt-based alloy is preferable. At least one element selected from the group consisting of Cr, Ni, Ta, and B may be added to a CoPt alloy for the purpose of reducing recording media noise. Further, from the standpoint of forming a stable granular structure, it is desirable that the nonmagnetic crystal grain boundaries be formed using oxides formed from at least one element selected from the group consisting of Cr, Co, Si, Al, Ti, and Ta.

Further, in the magnetic recording medium 1 shown in FIG. 3, a piezoelectric material 6 for forming a piezoelectric crystal is disposed adjacent to the magnetic recording layer 2, orientation control layer 3-1, and soft magnetic layer 3-2. The piezoelectric material 6 contracts or expands (usually called the photostrictive effect) in a direction crossing the tracks (i.e., in the cross-track direction) when the photostrictive effect is produced by laser beam radiation LB (or by ultraviolet radiation). With the contraction/expansion of the piezoelectric material 6, the magnetic recording layer 2 located adjacent to it is subjected to compressive stress. When the magnetic recording layer 2 is subjected to compressive stress, the inverse magnetostrictive effect produced serves to reduce the crystal magnetic anisotropy energy of the magnetic recording layer 2.

In the above explanation, the piezoelectric material for forming the piezoelectric crystal has been described as being set to contract and expand in the direction crossing the tracks, but the contracting/expanding direction is not limited to this specific direction. Stated another way, the piezoelectric material can be set to contract and expand in any desired direction by the polarization setting performed during the manufacture of the piezoelectric crystal.

Since the crystal magnetic anisotropy energy of the magnetic recording layer 2 is reduced as described above, the magnetic field to be generated by the magnetic head can be made weaker in the example of FIG. 3 than that in the prior art, thus allowing the use of the magnetic head when writing data (magnetizing signal MT). It is thus possible to address the need for even higher recording density required, in particular, of a magnetic recoding medium employing a high magnetic anisotropy material.

One method similar to the example of FIG. 3 would be a thermally assisted recording method. The thermally assisted recording method is a method that records information while heating the magnetic recording medium by laser beam radiation. A feature of the thermally assisted recording method is that a material having high coercivity (Hc) can be used. In the example of FIG. 3; however, the purpose is not to reduce the Hc by heating the magnetic recording layer but to cause the crystal magnetic anisotropy energy to change by deforming the crystal structure as a result of the application of stress to the magnetic material. It should be noted that the laser radiation (or ultraviolet radiation) used in the example of FIG. 3 is intended to mechanically deform the piezoelectric material having photostrictive properties, not to heat the magnetic recording medium.

The example of FIG. 3 has a shape such that the portion from the magnetic recording layer 2 down to the soft magnetic layer 3-2 is sandwiched on a track-by-track basis by the photostrictive piezoelectric material. However, as an alternative example, only the portion of the magnetic recording layer 2 may be chosen as the portion to be sandwiched.

Preferably, the piezoelectric material used in the example of FIG. 3 has a structure formed, for example, from a stack of PLZT ceramics. The PLZT ceramics refer to materials generally known as lead lanthanum zirconate titanate produced by adding lanthanum oxide to a solid solution of lead titanate and lead zirconate. This piezoelectric material exhibits the piezoelectric effect. Further, this piezoelectric material itself produces an electromotive force when subjected to the radiation of light of a certain wavelength (laser light or ultraviolet light). Because of this photoelectromotive effect coupled with the piezoelectric effect, mechanical deformation occurs when the material is subjected to the radiation of light. This piezoelectric material is used as a material for applying stress to the magnetic recording layer.

Other specific examples of such piezoelectric materials include barium titanate ($BaTiO_3$:BT), PZT ceramics ($Pb(Zr, Ti)O_3$), bismuth-containing perovskite compounds ($BiScO_3$—$PbTiO_3$:BPST), and potassium niobate ($KNbO_3$). Of these materials, potassium niobate is a promising piezoelectric material that can be used in the future, because this piezoelectric material is a single-crystalline material and the contracting/expanding direction of the material can be controlled.

Figure 4:
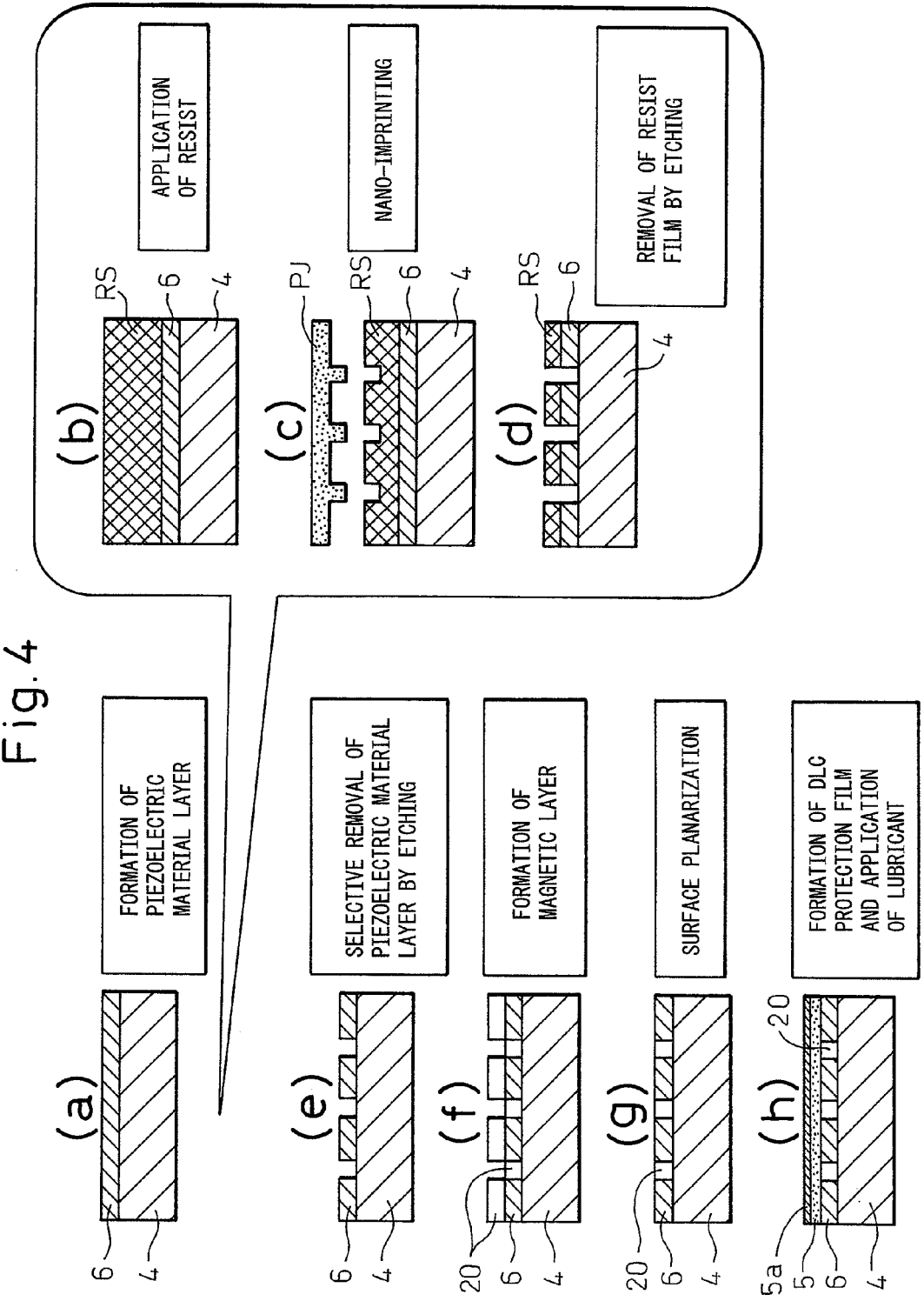
FIG. 4 is a diagram showing cross-sectional views illustrating the fabrication steps of the vertical magnetic recording medium according to the one example of the present embodiment.

FIG. 4 is a diagram showing cross-sectional views illustrating the fabrication steps of the vertical magnetic recording medium according to the one example of the present embodiment. The fabrication steps of the magnetic recording medium 1 according to the example of FIG. 3 are shown in simplified form.

In the fabrication of the magnetic recording medium 1 according to the example of FIG. 3, first a layer of piezoelectric material 6 is formed on the nonmagnetic substrate 4 by sputtering, vacuum evaporation, or like method, as shown in FIG. 4(a).

Next, a resist material RS is applied over the layer of piezoelectric material 6, as shown in FIG. 4(b). Then, a mask PJ is placed in intimate contact with the resist material RS, as shown in FIG. 4(c), and a fine pattern is formed on the resist material RS by exposing it to light radiation or electron beam radiation (this technique is usually called nano-imprinting).

Further, as shown in FIG. 4(d), the resist material RS is selectively removed by chemical or physical etching, and at the same time, the layer of piezoelectric material 6 is also selectively removed. The result is the formation of the layer of piezoelectric material 6 having, as shown in FIG. 4(e), a plurality of grooves conforming to the shape of the fine pattern of the mask PJ.

Next, a magnetic layer 20 is formed by sputtering, vacuum evaporation, or like method, as shown in FIG. 4(f). This magnetic layer 20 is formed by forming the soft magnetic layer 3-2, the orientation control layer 3-1, and the magnetic recording layer 2 one on top of another.

Further, as shown in FIG. 4(g), the surface is planarized by ion milling or like method. In this way, the magnetic layer 20 is formed in adjacent relationship to the layer of piezoelectric material 6 so as to fill each groove formed in the layer of piezoelectric material 6.

Finally, as shown in FIG. 4(h), the DLC protective film 5 is formed by CVD (Chemical Vapor Deposition), and a lubricant 5a is applied.

In the steps of FIGS. 4(a) to 4(h), the magnetic layer is formed after forming the piezoelectric material layer. Alternatively, the magnetic layer of magnetic material may first be deposited and etched, and thereafter, the piezoelectric material layer may be formed.

Figure 5:
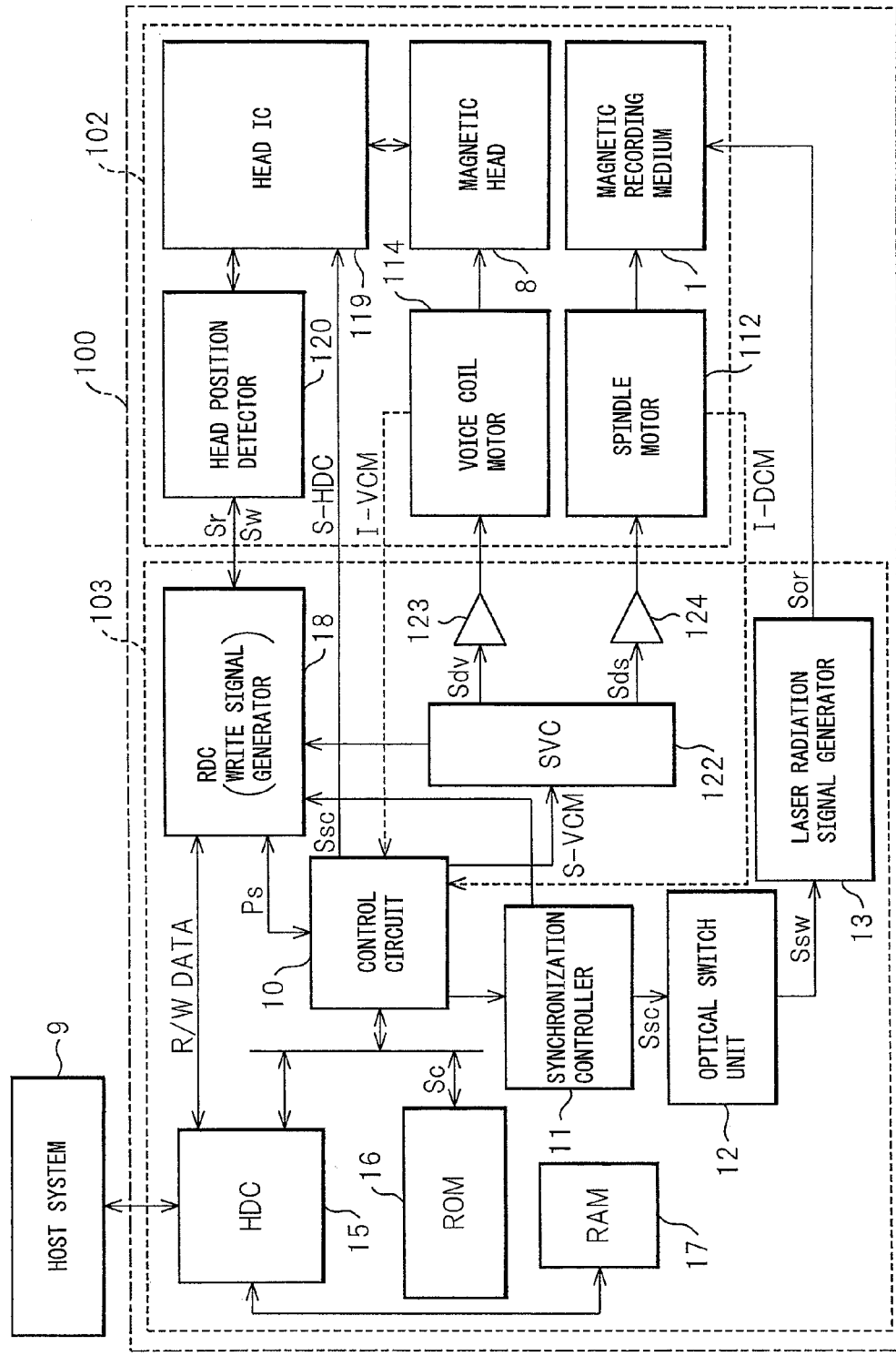
FIG. 5 is a block diagram showing the configuration of a magnetic recording apparatus incorporating the vertical magnetic recording medium according to the one example of the present embodiment.

FIG. 5 is a block diagram showing the configuration of the magnetic recording apparatus incorporating the vertical magnetic recording medium according to the one example of the present embodiment. Here, the configuration of the control unit 103 in the magnetic recording apparatus 100 incorporating the magnetic recording medium 1 according to the example of FIG. 3 is shown in simplified form.

As shown in FIG. 5, the reproduction signal read out from the magnetic recording medium 1 by using the vertical magnetic recording head 8 is supplied to a head IC 119 in the disk enclosure, and the signal is then detected and amplified by a head position detector 120 and supplied to the control unit 103.

In the control unit 103 shown in FIG. 5, a read channel (abbreviated RDC in FIG. 5, which also functions as a write signal generator) 18 for demodulating data information and servo information Ps from the reproduction signal Sr supplied from the head IC 119, and a control circuit 10, such as a microprocessor unit (MPU), for controlling all of the data read/write-related operations based on the servo information Ps supplied from the read channel 18, are mounted on the printed circuit assembly. Position information concerning the track position of the magnetic head 8 relative to the magnetic recording medium can be retrieved from the servo information Ps.

Further, in the control unit 103 shown in FIG. 5, there are also mounted on the printed circuit assembly a hard disk controller (abbreviated HDC in FIG. 5) for controlling the operation of the magnetic recording apparatus in accordance with commands issued from a host system 9 such as a host processor external to the magnetic recording apparatus 100, a ROM (Read-Only Memory) 16 for storing a program for executing data read/write operations, etc., a RAM (Random Access Memory) 17 for temporarily storing read/write data, and a serve controller 122 for controlling the operation of the spindle motor 112 and voice coil motor 114. Preferably, a high-speed large-capacity dynamic RAM (usually abbreviated DRAM) is used as the RAM 17.

In the control unit having the above configuration, when a data write command is issued from the host system 9, the control circuit 10 operates in accordance with the program (program-related information Sc) prestored in the ROM 16, and sends a read channel control signal to the read channel 18. The read channel 18, based on a read/write data signal (R/W DATA), sends a write signal Sw to the head IC 119. The head IC 119 amplifies the write signal Sw and supplies it to the magnetic head 8.

On the other hand, when a data read command is issued from the host system 9, the control circuit 10 operates in accordance with the program (program-related information Sc) prestored in the ROM 16, and sends a hard disk control signal S-HDC to the head IC 119. In response, the head IC 119 amplifies the reproduction signal output from the magnetic head 8 and supplies it to the read channel 18. Then, the reach channel 18, based on the read/write data signal (R/W DATA), checks whether the reproduction signal Sr has been read out from the correct sector position on the disk surface, and sends the control circuit 18 the servo information Ps that contains the position information concerning the sector position.

Further, based on the servo information Ps and on various control signals from the host system 9, the control circuit 18 generates a VCM control signal S-VCM for controlling the operation of the voice coil motor 114, and sends it to the servo controller 112. Then, a voice coil motor servo signal Sdv, generated based on the VCM control signal S-VCM, is supplied via a driver 123 to the voice coil motor 114. The voice coil motor 114 is activated in accordance with the servo signal Sdv (current I-VCM flows to the voice coil motor 114), and an operation such as a seek operation is performed to place the magnetic head 8 over the designated position. At the same time, a spindle motor servo signal Sds, also generated based on the VCM control signal S-VCM, is supplied via a driver 124 to the spindle motor 112. The spindle motor 112 is activated in accordance with the servo signal Sds (current I-DCM flows to the spindle motor 112) to drive the magnetic recording medium 1 for rotation.

Further, in the control unit 103 shown in FIG. 5, there are provided, in order to reduce the crystal magnetic anisotropy energy of the magnetic recording layer by means of the inverse magnetostrictive effect produced within the magnetic recording layer by the contraction/expansion of the piezoelectric material subjected to laser radiation, etc., (refer to FIG. 3) a synchronization controller 11 for synchronizing the data write timing of the magnetic head 8 to the timing of laser radiation, etc., an optical switch unit 12 which performs a switching operation in accordance with a synchronization control signal Ssc from the synchronization controller 11, and a laser radiation signal generator 13 which generates a laser radiation signal in accordance with an optical switch signal Ssw from the optical switch unit 12.

When the crystal magnetic anisotropy energy of the magnetic recording layer is reduced by applying the laser radiation signal Sor to the magnetic recording medium 1 under the control of the synchronization controller 11, optical switch unit 12, and laser radiation signal generator 13 described above, a data write operation is performed by applying a prescribed magnetic field to the magnetic head 8.

Figure 6:
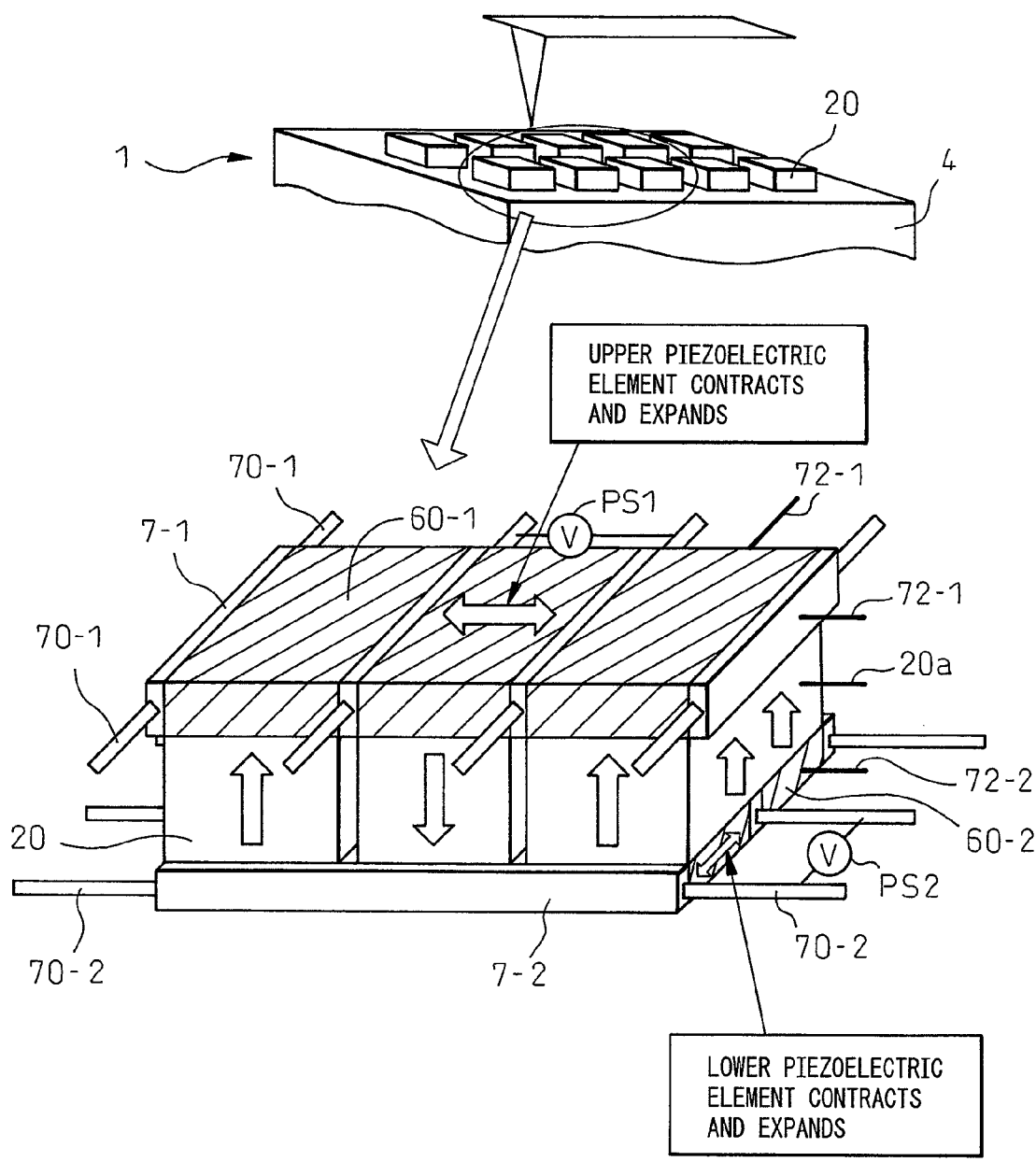
FIG. 6 is a perspective view showing the structure of a vertical magnetic recording medium according to another example of the present embodiment.

FIG. 6 is a perspective view showing the structure of a vertical magnetic recording medium according to another example of the present embodiment.

In the magnetic recording medium 1 shown in FIG. 6, there are provided first electrodes 7-1 formed on the upper surface of the magnetic layer 20 in such a manner as to be spaced a predetermined distance apart from each other on the substrate 4 in a direction crossing the track (the cross-track direction) or in a direction extending along the track (the down-track direction), and second electrodes 7-2 formed on the lower surface of the magnetic layer 20 in such a manner as to be spaced a predetermined distance apart from each other in a vertical direction in-plane relative to the direction of the first electrodes 7-1 formed on the magnetic layer 20.

Further, in the magnetic recording medium 1 of FIG. 6, a first piezoelectric element 60-1 and a second piezoelectric element 60-2, each as a piezoelectric member for forming a piezoelectric crystal, are provided on the upper and lower surfaces of the magnetic layer 20 in such a manner as to sandwich the magnetic layer 20 therebetween.

The first piezoelectric element 60-1 is formed between the first electrodes 7-1 having a pair of lead portions 70-1, and the second piezoelectric element 60-2 is formed between the second electrodes 7-2 having a pair of lead portions 70-2, while the magnetic recording layer within the magnetic layer 20 is formed between the first piezoelectric element 60-1 and the second piezoelectric element 60-2. The magnetic recording layer is provided with a lead 20a. The first electrodes 7-1 are each provided with another lead 72-1, and the second electrodes 7-2 are each provided with another lead 72-2.

In the magnetic recording medium 1 of FIG. 6, the portion of the magnetic layer 20 sandwiched between the first piezoelectric element 60-1 and the second piezoelectric element 60-2 forms one recording unit, and a plurality of such recording units are arranged in a checkerboard pattern. A stress just sufficient to cause the crystal magnetic anisotropy energy of the magnetic recording layer to change only in the recording unit portion energized vertically by power supplies PS1 and PS2 (the stress is generated by the contraction/expansion of the first and second piezoelectric elements 60-1 and 60-2) is applied by the action of the first and second piezoelectric elements 60-1 and 60-2, and data is written into that recording unit. For example, in the case of FIG. 6, the first electrodes 7-1 are arranged relative to the first piezoelectric element 60-1 on the upper surface of the magnetic layer 20 so that deformation can be caused selectively in the column direction (longitudinal direction in FIG. 6). On the other hand, the second electrodes 7-2 are arranged relative to the second piezoelectric element 60-2 on the lower surface of the magnetic layer 20 so that deformation can be caused selectively in the row direction (lateral direction in FIG. 6). The crystal magnetic anisotropy energy of the magnetic recording layer is caused to change only in the recording unit deformed in both the column and row directions, thus allowing data to be written by the magnetic head.

In the example of FIG. 6, the piezoelectric members formed as the first and second piezoelectric elements have been set to contract and expand in the direction crossing the track or the direction extending along the track, but the contracting/expanding direction is not limited to such directions. Stated another way, the first and second piezoelectric elements can each be set to contract and expand in any desired direction by the polarization setting performed during the manufacture of the piezoelectric crystal.

Figure 7:
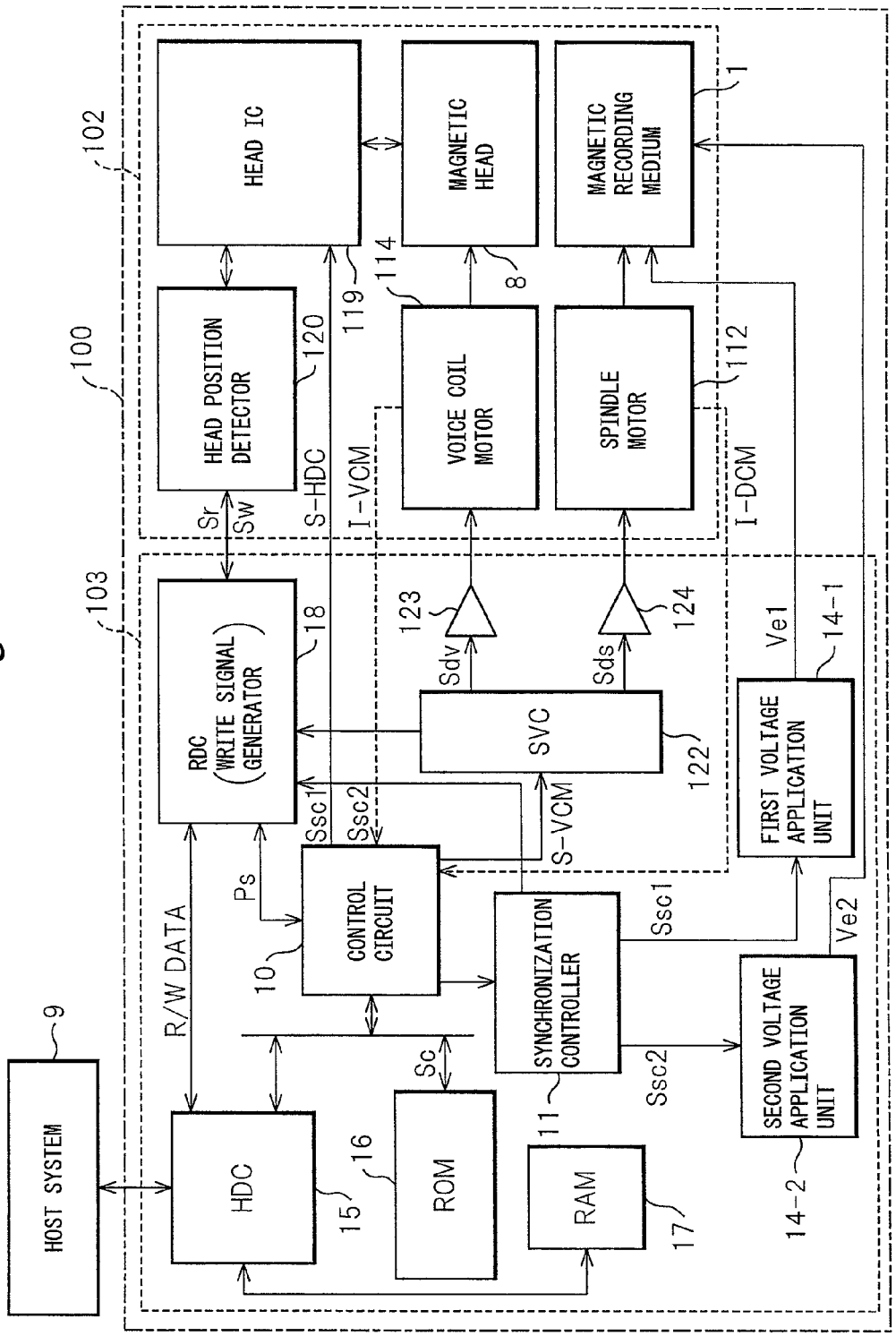
FIG. 7 is a block diagram showing the configuration of a magnetic recording apparatus according to another example of the present embodiment.

FIG. 7 is a block diagram showing the configuration of a magnetic recording apparatus according to another example of the present embodiment. The configuration of the control unit 103 in the magnetic recording apparatus 100 incorporating the vertical magnetic recording medium according to the example of FIG. 6 is shown in simplified form.

The configuration of the magnetic recording apparatus according to the example of FIG. 7 is substantially the same as that of the magnetic recording apparatus according to the earlier described example of FIG. 5, except that the optical switch unit 12 and laser radiation signal generator 13 in FIG. 5 are replaced by a first voltage application unit 14-1 and a second voltage application unit 14-2. Therefore, the description of the component elements, other than the first and second voltage application units 14-1 and 14-2, will not be repeated.

In the control unit 103 shown in FIG. 7, there are provided, in order to reduce the crystal magnetic anisotropy energy of the magnetic recording layer by means of the inverse magnetostrictive effect produced within the magnetic recording layer by the contraction/expansion of the piezoelectric material subjected to voltage application (refer to FIG. 6), the synchronization controller 11 for synchronizing the data write timing of the magnetic head 8 to the timing of voltage application, and the first and second voltage application units 14-1 and 14-2 for supplying prescribed voltages Ve1 and Ve2 to the first and second piezoelectric elements 60-1 and 60-2, respectively, in accordance with two synchronization control signals Ssc1 and Ssc2 supplied from the synchronization controller 11.

When the crystal magnetic anisotropy energy of the magnetic recording layer is reduced by applying the prescribed voltages to the first and second piezoelectric elements 60-1 and 60-2 on the upper and lower surfaces of the magnetic recording medium 1 under the control of the synchronization controller 11 and the first and second voltage application units 14-1 and 14-2 described above, a data write operation is performed by applying a prescribed magnetic field to the magnetic head 8.

While the above examples have each been described by taking a vertical magnetic recording medium as an example, it will be appreciated that the technique according to the present invention is not limited in its application to vertical magnetic recording media, but can also be applied to longitudinal magnetic recording media in which the direction of magnetization recorded in the magnetic recording layer is parallel to the plane of the recording media.

What is claimed is:

1. A magnetic recording medium comprising:
a substrate;
a magnetic recording layer formed on said substrate to record magnetic information; and
piezoelectric material disposed adjacent to said magnetic recording layer and capable of contracting and expanding, and
further comprising:
first electrodes formed in such a manner as to be spaced a predetermined distance apart from each other on said substrate in the direction crossing a track on said magnetic recording layer or in a direction extending along said track;
second electrodes formed in such a manner as to be spaced a predetermined distance apart from each other in a vertical direction in-plane relative to the direction of said first electrodes formed on said magnetic recording layer, and wherein
said piezoelectric material is comprised of piezoelectric members that are formed as a first piezoelectric element and a second piezoelectric element, respectively,
said first piezoelectric element is formed between said first electrodes,
said second piezoelectric element is formed between said second electrodes, and
said magnetic recording layer is formed between said first piezoelectric element and said second piezoelectric element.

2. A magnetic recording medium as claimed in claim 1, wherein when a voltage is applied, said first piezoelectric element contracts or expands at least in the direction crossing said track or the direction extending along said track, and said second piezoelectric element contracts or expands in a vertical direction in-plane relative to the contracting/expanding direction of said first piezoelectric element.

3. A magnetic recording medium as claimed in claim 2, wherein said first piezoelectric element and said second piezoelectric element are each formed from a material selected from the group consisting of lead lanthanum zirconate titanate, barium titanate, and potassium niobate.

4. A magnetic recording apparatus comprising:
a magnetic recording medium comprising a substrate, a magnetic recording layer formed on said substrate to record magnetic information, first electrodes formed in such a manner as to be spaced a predetermined distance apart from each other on said substrate in a direction crossing a track on said magnetic recording layer or in a direction extending along said track, second electrodes formed in such a manner as to be spaced a predetermined distance apart from each other in a vertical direction in-plane relative to the direction of said first electrodes formed on said magnetic recording layer, a first piezoelectric element formed between said first electrodes, and a second piezoelectric element formed between said second electrodes, wherein said magnetic recording layer is formed between said first piezoelectric element and said second piezoelectric element;
voltage applying means for applying, in accordance with the recording position of said magnetic information, a voltage to said first and second piezoelectric elements, respectively, via said first and second electrodes of said magnetic recording medium; and
magnetic field applying means for applying a magnetic field to said magnetic recording medium.

5. A magnetic recording apparatus as claimed in claim 4, wherein said piezoelectric material is selected from the group consisting of lead lanthanum zirconate titanate, barium titanate, and potassium niobate.

* * * * *